(12) United States Patent
Ailamaki et al.

(10) Patent No.: US 9,298,754 B2
(45) Date of Patent: Mar. 29, 2016

(54) QUERY MANAGEMENT SYSTEM AND ENGINE ALLOWING FOR EFFICIENT QUERY EXECUTION ON RAW DETAILS

(71) Applicant: Ecole Polytechnique Federale de Lausanne (EPFL), Lausanne (CH)

(72) Inventors: Anastasia Ailamaki, Saint-Sulpice (CH); Stratos Idreos, Edam-Volendam (NL); Ioannis Alagiannis, Lausanne (CH); Renata Borovica, Chavannes-près-Renens (CH); Miguel Sergio De Oliveira Branco, Monnaz (CH)

(73) Assignee: Ecole Polytechnique Federale de Lausanne (EPFL) (027559), Lausanne (CH)

( * ) Notice: Subject to any disclaimer, the term of this patent is extended or adjusted under 35 U.S.C. 154(b) by 0 days.

(21) Appl. No.: 13/678,180

(22) Filed: Nov. 15, 2012

(65) Prior Publication Data

US 2014/0136513 A1    May 15, 2014

(51) Int. Cl.
*G06F 17/30* (2006.01)

(52) U.S. Cl.
CPC .... *G06F 17/30306* (2013.01); *G06F 17/30312* (2013.01); *G06F 17/30336* (2013.01)

(58) Field of Classification Search
None
See application file for complete search history.

(56) References Cited

U.S. PATENT DOCUMENTS

| 6,076,087 | A  | * | 6/2000  | Suciu |
| 2002/0010714 | A1 | * | 1/2002  | Hetherington ............... 707/505 |
| 2004/0243645 | A1 | * | 12/2004 | Broder et al. ............... 707/200 |
| 2005/0131886 | A1 | * | 6/2005  | Ejerhed et al. ............... 707/3 |
| 2006/0190465 | A1 | * | 8/2006  | Nakano ............... 707/100 |
| 2008/0243479 | A1 | * | 10/2008 | Cafarella et al. ............... 704/9 |
| 2008/0263032 | A1 | * | 10/2008 | Vailaya et al. ............... 707/6 |
| 2010/0161569 | A1 | * | 6/2010  | Schreter ............... 707/696 |
| 2011/0302189 | A1 | * | 12/2011 | Liu et al. ............... 707/769 |
| 2011/0307435 | A1 | * | 12/2011 | Overell et al. ............... 706/46 |
| 2014/0040306 | A1 | * | 2/2014  | Gluzman Peregrine et al. ............... 707/769 |

OTHER PUBLICATIONS

Idreos et al.; "Here are my Data Files. Here are my Queries. Where are my Results?"; 5th Biennial Conference on Innovative Data Systems Research (CIDR 2011); pp. 57-68.*
Chu et al., "A relational approach to incrementally extracting and querying structure in unstructured data", Proceedings of the 33rd international conference on Very large data bases, VLDB Endowment, 2007, pp. 1045-1056.*
Agichtein et al., "Querying Text Databases for Efficient Information Extraction", Proceedings of the 19th International Conference on Data Engineering (ICDE '03), IEEE, 2003, pp. 113-124.*
Jain et al., "Optimizing SQL Queries over Text Databases", 24th International Conference on Data Engineering (ICDE '08), IEEE, 2008, pp. 636-645.*
Lorincz et al., "Grep versus FlatSQL versus MySQL: Queries using UNIX tools vs. a DBMS", 2003, Accessed on Feb. 18, 2014 from: http://www.eecs.harvard.edu/~konrad/projects/flatsqlmysql/final_paper.pdf.*
Alagiannis, I. et al., "NoDB: Efficient Query Execution on Raw Data Files", SIGMOD '12, Proceedings of the 2012 ACM SIGMOD International Conference on Management of Data, (May 20-24, 2012), pp. 241-252, Scottsdale, AZ, US.

* cited by examiner

*Primary Examiner* — Alex Gofman
*Assistant Examiner* — Umar Mian
(74) *Attorney, Agent, or Firm* — Davis Wright Tremaine LLP; Philip H. Albert

(57) ABSTRACT

A database system maintains a feature set of a modern database system while operating directly on raw data files. Systems may use an adaptive indexing mechanism that maintains positional information to provide efficient access to raw data files, a flexible caching structure, and techniques for selective parsing and selective tokenizing. In doing so, possible performance bottlenecks associated with repeated parsing, tokenizing, and expensive data type conversion costs can be overcome.

10 Claims, 4 Drawing Sheets

QUERY MANAGEMENT SYSTEM AND ENGINE ALLOWING FOR EFFICIENT QUERY EXECUTION ON RAW DETAILS

BACKGROUND OF THE INVENTION

Computer technology is now entering the era of data deluge, where the amount of data is outgrowing the capabilities of query processing technology. Many emerging applications, from social networks to scientific experiments, are representative examples of this deluge, where the rate at which data is produced exceeds any past experience. Scientific analysis such as astronomy is soon expected to collect multiple terabytes of data on a daily basis, while web-based businesses such as social networks or web log analysis are already confronted with a growing stream of large data inputs. Therefore, there is a clear need for efficient big data processing to enable the evolution of businesses and sciences to the new, era of data deluge.

Although the Database Management System (DBMS) remains overall the predominant data analysis technology, it is rarely used for emerging applications such as scientific analyses and social networks. This is largely due to the complexity involved; there is a significant initialization cost in loading data and preparing the database system for queries. For example, a scientist may need to quickly examine a few terabytes of new data in search of certain properties. Even though only few attributes might be relevant for the task, the entire data set must first be loaded inside the database. For large amounts of data, this means a few hours of delay, even with parallel loading across multiple machines. Besides being a significant time investment, it is also important to consider the extra computing resources required for a full load and its side-effects with respect to energy consumption and economical sustainability.

Instead of using database systems, emerging applications rely on custom solutions that usually miss important database features. For instance, declarative queries, schema evolution and complete isolation from the internal representation of data are rarely present. The problem with the situation today is in many ways similar to the past, before the first relational systems were introduced; there are a wide variety of competing approaches but users remain exposed to many low-level details and must work close to the physical level to obtain adequate performance and scalability.

BRIEF SUMMARY OF THE INVENTION

Embodiments of the present invention overcome some or all of the aforementioned deficiencies in the related art. An embodiment is shown to make database systems more accessible to the user by eliminating major bottlenecks of current state-of-the-art technology that increase the data-to-query time. The data-to-query time is of critical importance as it defines the moment when a database system becomes usable and thus useful. There are fundamental processes in modern database architectures that represent a major bottleneck for data-to-query time. The present invention changes the way a user interacts with a database system by eliminating one of the most important bottlenecks: data loading. The embodiment uses in situ querying as the principal way to manage data in a database and proposes extending traditional query processing architectures to work in situ.

The idea of adaptive data loads is presented as an alternative to full a priori loading. The invention can be used to make raw files first-class citizens without sacrificing query processing performance. It also includes several innovative techniques such as selective tokenizing, parsing, tuple formation, and adaptive indexing structures for raw files, in combination with query-driven caching techniques and statistics collection for raw files.

DETAILED DESCRIPTION OF THE INVENTION

Embodiments of the invention relate to the construction of a database system that provides access to data without loading, while maintaining query processing performance that is competitive with a database system operating over previously loaded data. In other words, embodiments are able to completely shed loading costs, while achieving or improving the query processing performance of a traditional DBMS. Such performance characteristics make the present invention usable and flexible; a user may only think about the kind of queries to pose and not about setting up the system in advance and going through all the initialization steps that are necessary in prior art.

Figure 1:
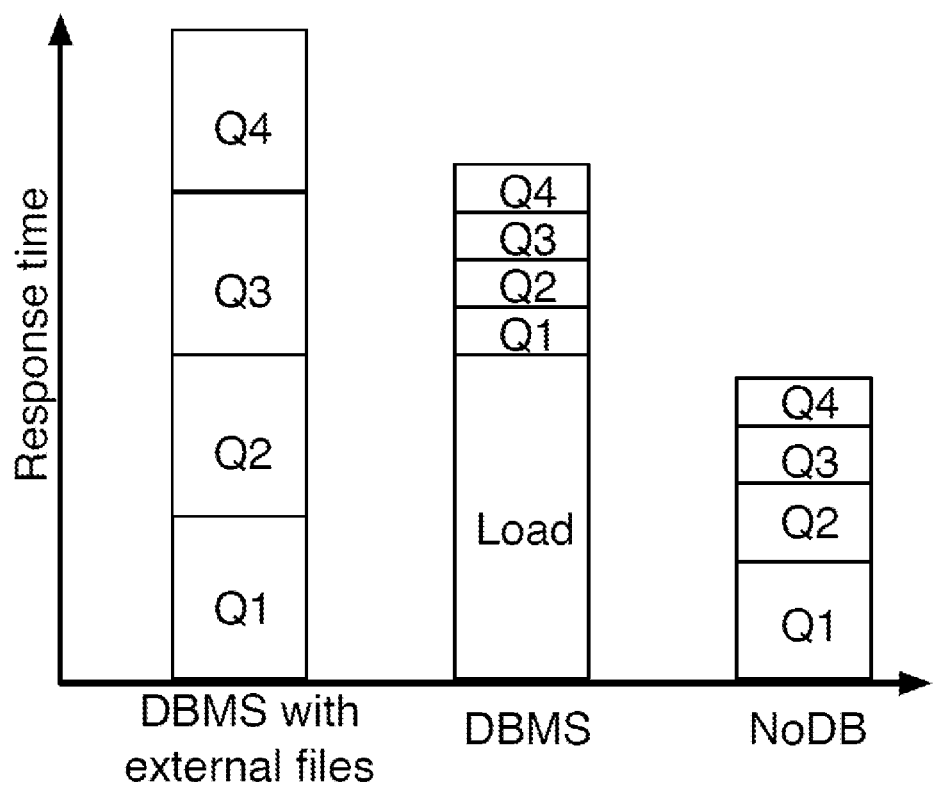
FIG. 1 shows a figure depicting improved user interaction in embodiments of the invention.

Embodiments of the invention take significant steps in identifying and eliminating or greatly minimizing initialization and query processing costs that are unique for in situ systems. The target behavior is visualized in FIG. 1. It illustrates an aspect of the present invention; even though individual queries may take longer to respond than in a traditional system, the data-to-query time is reduced, because there is no need to load and prepare data in advance or to fine tune the system when different queries arrive. In addition, performance improves gradually as a function of the number of queries processed.

Embodiments also minimize the cost of raw data access through the careful design of data structures that can speed-up such accesses, and selectively eliminating the need for raw data access by carefully caching and scheduling raw data accesses.

Example Implementations

Embodiments of the present invention may minimize parsing and tokenizing costs within a row-store database engine via selective and adaptive parsing actions. In addition, embodiments may use a raw file indexing structure that adaptively maintains positional information to speed-up future accesses on raw files. Embodiments may also employ caching, exploitation of statistics, and update-handling mechanisms. Embodiments of the invention may be based upon traditional row-stores systems, column-store systems, or hybrid database engines.

Data in embodiments of the invention may be stored in raw data files. Raw data files are comprised of tuples, each of which contains some number of fields. Each field provides a data value for an attribute of the data file. Fields in different tuples may share the same attribute. Conceptually, data files can be structured in a row-store format (where each row represents a tuple), column store format (where each column represents a tuple), or any other format known in the art.

Comma-separated value (CSV) files are used as an example file format, but the technique can easily be extended to other file types. CSV files are challenging for an in situ engine since data is stored in a character-based encoding such as ASCII, and fields are variable length. This causes conversion to be expensive. Handling CSV files necessitates a wider combination of techniques than handling, for example, structured binary files.

On-the-fly Parsing

We first discuss aspects related to on-the-fly raw file parsing and features such as selective tokenizing, parsing, and tuple formation. We later describe functional components in various embodiments.

Query plans. When a query submitted to the database system references relational tables that are not yet loaded, the database system needs to access the respective raw file(s). Embodiments may override the scan operator with the ability to access raw data files directly, while the remaining query plan, generated by the optimizer, works without changes compared to a conventional DBMS. A query is said to reference an attribute when that attribute needs to be processed to complete the query (e.g., if the attribute is included in a SQL query's WHERE clause). An attribute is further considered to be requested by a query if the query output contains that attribute (e.g., if the attribute appears in a SQL query's SELECT clause).

Parsing and Tokenizing Raw Data. When a query needs to access raw data, embodiments may perform parsing and, for attributes whose positions are not known, tokenization. During parsing, the database system first identifies each tuple, or row in the raw file. In the case of CSV files, this involves finding the end-of-line delimiter, which is determined by scanning each character, one by one, until the end-of-line delimiter is found. In differently structured files this process may not be required. The database system must also search for the delimiter separating different values in a row (which is usually a comma for CSV files). The final step is to transform those characters into their proper binary values depending on the respective attribute type. Having the binary values at hand, the database system feeds those values in a typical DBMS query plan. Overall, these extra parsing and tokenizing actions represent a significant overhead that is unique for in situ query processing; a typical DBMS performs all these steps at loading time and directly reads binary database pages during query processing.

Selective Tokenizing. One way to reduce the tokenizing costs is to abort tokenizing tuples as soon as all referenced attributes for a query have been found. This occurs at a per tuple basis. For example, if a query needs the 4th and 8th attribute of a given table, the database system needs to only tokenize each tuple of the file up to the 8th attribute. Given that CSV files are organized in a row-by-row basis, selective tokenizing may not bring any I/O benefits; nonetheless, it significantly reduces the CPU processing costs.

Selective Parsing. In addition to selective tokenizing, embodiments may also employ selective parsing to further reduce raw file access costs. Embodiments need only to transform to binary the values required for the remaining query plan. Consider again the example of a query requesting the 4th and 8th attribute of a given table. If the query contains a selection on the 4th attribute, the embodiment must convert all values of the 4th attribute to binary. However, embodiments with selective parsing delay the binary transformation of the 8th attribute on a per tuple basis, until it is determined that the given tuple qualifies, i.e., until the embodiment has performed the selection on the fourth attribute of this tuple. The last step is important since the transformation to binary is a major cost component in the embodiment.

Selective Tuple Formation. To fully capitalize on selective parsing and tokenizing, embodiments may also apply selective tuple formation. Therefore, tuples are not fully composed but only need to contain the attributes requested in a given query. In such embodiments, tuples are only created after the select operator, i.e. after knowing which tuples qualify. This also involves a mapping of the current tuple format to the final expected tuple format.

Overall, selective tokenizing, parsing and tuple formation help to significantly minimize the on-the-fly processing costs, since embodiments may perform each processing step on only the data necessary to produce query answers.

Indexing

Even with selective tokenizing, parsing and tuple formation, the cost of accessing raw data is still significant. This section introduces an auxiliary structure that allows embodiments to maintain the performance of a DBMS with previously loaded data. This auxiliary structure comprises of a positional map, and may form a component of embodiments.

Adaptive Positional Map. An adaptive positional map can be used to reduce parsing and tokenizing costs. It maintains low level metadata information on the structure and data positions within the raw file, which is used to navigate and retrieve raw data faster. This metadata information refers to positions of attributes in the raw file. For example, if a query needs an attribute X that is not loaded, then embodiments can exploit this metadata information that describes the position of X in the raw file and jump directly to the correct position without having to perform expensive tokenizing steps to find X.

Map Population. The positional map is created on-the-fly during query processing, continuously adapting to queries. Initially, the positional map is empty. As queries arrive, embodiments may adaptively and continuously augment the positional map. The map is populated during the tokenizing phase, i.e., while tokenizing the raw file for the current query, the database system adds information to the map. The database system captures as much information as possible during each query. For instance, it does not keep maps only for the attributes requested in the query, but also for attributes tokenized along the way; e.g. if a query requests attributes in positions 10 and 15, all positions from 1 to 15 may be kept.

Storage Requirements. In general, we expect variable-length attributes in the raw data, i.e., the same attribute X appears in different relative positions across different tuples. The requirement to support variable-length attributes demands the positional map to store positions for every tuple in a table. To minimize the storage requirements, embodiments may use run-length encoding to store its positions.

Figure 2:
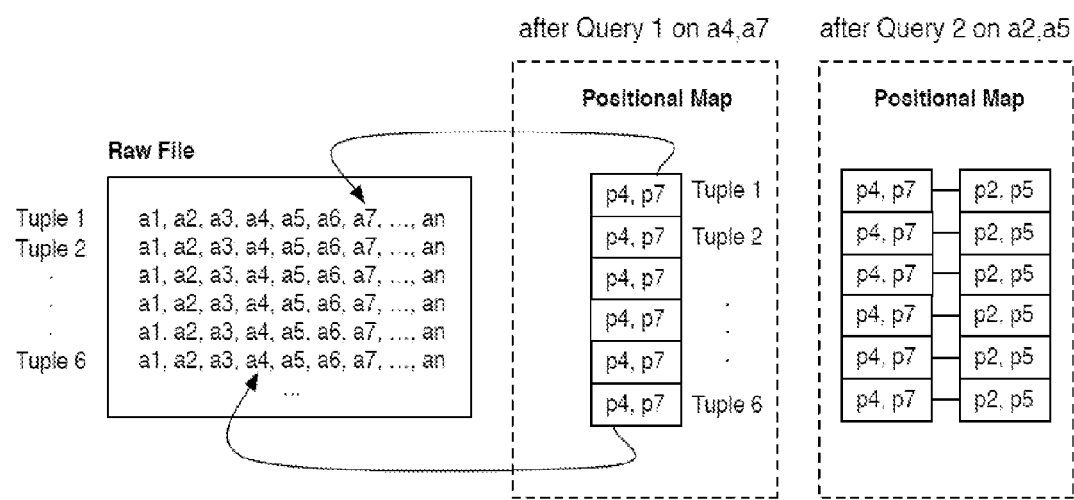
FIG. 2 shows a possible data structure format while indexing raw files.

Storage Format. The dynamic nature of the positional map requires a physical organization that is easy to update. It must also incur low cost, to minimize its overhead during query execution. To achieve efficient reads and writes, embodiments may implement the positional map as a collection of chunks, partitioned vertically and horizontally. Each chunk fits comfortably in the CPU caches, allowing embodiments to efficiently acquire all information regarding several attributes and tuples with a single access. The map can also be extended by adding more chunks either vertically (i.e., adding positional information about more tuples of already partially indexed attributes) or horizontally (i.e., adding positional information about currently non-indexed attributes). FIG. 2 shows an example of a positional map, where the attributes do not necessarily appear in the map in the same order as in the raw file. The positional map does not mirror the raw file. Instead, it adapts to the workload, keeping in the same chunk attributes accessed together during query processing.

Scheduling Map Accesses. In addition, embodiments may maintain a higher level data structure that contains the order of attributes in the map in respect to their order in the file. The data structure is used by the database system to quickly determine the position of a given attribute in the positional map and the order in which multiple attributes should be accessed in order to guarantee sequential access patterns and thus good performance. For example, if a query requests the 4th and the 8th attribute and both are indexed in the map but the 8th attribute is indexed before the 4th attribute (e.g. because it was collected earlier), then for each tuple, the database system retrieves first the position of the 8th attribute and then the position of the 4th attribute. Furthermore, in order to minimize the costs of retrieving information from the map, the database system retrieves first all positions for the attributes needed in the WHERE clause of a query. It will then access the map for positional information of SELECT clause attributes, only for tuples that qualify from the WHERE clause.

Exploiting the Positional Map. The information contained in the positional map can be used by embodiments to jump to an exact position in the file or as close as possible. For example, if attribute A is the 4th attribute of the raw file and the map contains positional information for the 4th and the 5th attribute, then embodiments do not need to tokenize the 4th attribute; for each tuple, attribute A comprises the characters that appear between two positions contained in the map. Similarly, if a query is looking for the 9th attribute of a raw file, while the map contains information for the 4th and the 8th attribute, embodiments can still use the positional map to jump to the 8th attribute and tokenize it until it finds the 9th attribute. This incremental tokenization can occur in both directions, so that a query requesting the 10th attribute with a positional map containing the 2nd and the 12th attributes, jumps initially to the position of the 12th attribute and tokenizes backwards.

Pre-fetching. Embodiments may opt to first determine all needed positions instead of interleaving parsing with search and computation. Pre-fetching and pre-computing all relevant positional in-formation allows a query to optimize its accesses on the map; it brings the benefit of temporal and spatial locality when reading the map while not disturbing the parsing and tokenizing phases with map accesses and positional computation. All pre-fetched and pre-computed positions are stored in a temporary structure similar to the positional map;

the difference is that this temporary map only needs to contain the positional information referenced by the current query and that all positional information has been pre-computed. The temporary map may be dropped once the current query finishes its parsing and tokenizing phase but may also be kept for as long as needed for future queries.

Maintenance. The positional map is an auxiliary structure and may be dropped fully or partly at any time without any loss of critical information; the next query simply starts re-building the map from scratch or the parts which are missing. Embodiments may assign a storage threshold for the size of the positional map such that the map fits comfortably in memory. Once the storage threshold is reached, embodiments may drop parts of the map to ensure it is always within the threshold limits. Embodiments may use an LRU policy or other replacement policy to maintain the map.

Along with dropping parts of the positional map, embodiments may support writing parts of the positional map from memory to disk. Positional information that is about to be evicted from the map can be stored on disk using its original storage format. Thus, it is still possible to regulate the size of the positional map while maintaining relevant positional information not used by current queries. Accessing parts of the positional map from disk increases the I/O cost, yet it helps to avoid repeating tokenizing steps for workload patterns previously examined.

Adaptive Behavior. The positional map is an adaptive data structure that continuously indexes positions based on the most recent queries. This includes requested attributes as well as patterns, or combinations, in which those attributes are used. As the work-load evolves, some attributes may no longer be relevant and are dropped by the LRU policy. Similarly, combinations of attributes used in the same query, which are also stored together, may be dropped to give space for storing new combinations. Populating the map with new combinations is decided during pre-fetching, depending on where the requested attributes are located on the current map. The distance that triggers indexing of a new attribute combination may be a parameter in embodiments. The default setting may be that if all requested attributes for a query belong in different chunks, then the new combination is indexed.

Caching

The positional map allows for efficient access of raw files. In embodiments, this is complemented with a query-driven cache, which avoids raw file accesses altogether. The cache temporarily holds previously accessed data, e.g., a previously accessed attribute or even parts of an attribute. If the attribute is requested by future queries, embodiments will read it directly from the cache.

The cache holds binary data and is populated on-the-fly during query processing. Once a disk block of the raw file has been parsed during a scan, embodiments cache the binary data immediately. To minimize the parsing costs and to maintain adaptive behavior, caching does not force additional data to be parsed, i.e., only the requested attributes for the current query are transformed to binary. The cache follows the format of the positional map such that it is easy to integrate it in to the database system's query flow, allowing queries to seamlessly exploit both the cache and the positional map in the same query plan.

The size of the cache is a parameter than can be tuned depending on the resources. Embodiments may follow an LRU policy to drop and populate the cache. Nevertheless, embodiments should differentiate between string and other attribute types depending on the character-encoding scheme. For instance, for ASCII data, numerical attributes are significantly more expensive to convert to binary. Thus, the database system's cache always gives priority to attributes more costly to convert. Overall, the database system's cache can be seen as the place holder for adaptively loaded data.

Statistics

Optimizers rely on statistics to create good query plans. Most important choices have to do with selectivity estimation that helps ordering operators such as joins and selections. Creating statistics in modern databases, however, is only possible after data is loaded.

Embodiments may implement a scan operator to create statistics on-the-fly. Such an embodiment invokes the native statistics routines of the DBMS, providing it with a sample of the data. Statistics are then stored and are exploited in the same way as in conventional DBMS. In order to minimize the overhead of creating statistics during query processing, the embodiment creates statistics only on requested attributes, i.e., only on attributes that the embodiment needs to read and which are referenced by at least the current query. As with other features in the embodiment, statistics are generated in an adaptive way; as queries request more attributes of a raw file, statistics are incrementally augmented to represent bigger subsets of the data.

On-the-fly creation of statistics brings a small overhead to the embodiment's scan operator, while allowing embodiments to implement high-quality query execution plans.

Updates

Embodiments may support for two different kinds of updates: external and internal. External updates occur when a user directly updates one of the raw data files (e.g. via a text editor) or simply adds a new data file that contains new tuples. Internal updates are triggered by SQL statements to the present invention. As soon as raw data files are updated or new files are added, their contents are immediately available for querying without further delays as there are no initialization costs in the present invention.

Adding new data files or externally updating a data file in an append-like scenario can be handled by updating the low-level information collected in the positional map and the data stored in the cache. When a new file is added, no auxiliary data structures have been created for this file in the past so no actions are required. On the other hand, coping with appends on existing files may need extending the positional map and the cache to include the new information the first time the respective file is queried.

Supporting in place updates (i.e., changing existing contents of raw files) is more complicated, especially in the case of the positional map. A change in a position of an attribute in the data file might call for significant reorganization although the run-length encoding storage of the positional map facilitates incremental changes. Nevertheless, being an auxiliary data structure, the positional map can be dropped and recreated when needed again.

Optimizations

Flexible Storage. Embodiments of the present invention may not require a priori loading, which implies they also do not require a priori decisions on how data is physically organized during loading. Data that is adaptively loaded can be cached in memory or written to disk in a format that enables faster access in the future. Data compression can also be applied, where beneficial. Deciding the proper memory and storage layout is an open research question. Rows, columns and hybrids all have comparative advantages and disadvantages. Nevertheless, embodiments benefit uniquely from avoiding making these decisions in advance. In various embodiments, physical layout decisions can be done online, and change over time as the workload changes; every time data is brought from raw files. Such a system can make dynamic decisions regarding the physical layout to use based on the workload.

Adaptive Indexing. Furthermore, embodiments bring new opportunities towards achieving fully autonomous database systems, i.e., systems that require zero initialization and administration. Adaptive indexing can be exploited and enhanced for systems based on the present invention. Such systems with adaptive indexing can avoid both index creation and loading costs, while providing full-featured database functionality.

Auto Tuning Tools. Embodiments described above consider the hard case of zero a priori idle time or workload knowledge. Traditional systems assume "infinite" idle time and knowledge to perform all necessary initialization steps. In many cases, though, the reality can be somewhere in between. For example, there might be some idle time but not enough to load all data. Embodiments may support auto-tuning tools which, given a budget of idle time and workload knowledge, can exploit idle time as best as possible, loading and indexing as much of the relevant data as possible. This step can be done by executing anticipated queries: queries that are expected to be executed in the future, or by directly indexing data. The rest of the data remains unloaded and unindexed until relevant queries arrive. The tuning tool takes into account raw data access costs, I/O costs in addition to the typical query workload based parameters used by modern auto tuning tools. Embodiments may allow exploiting every single bit of idle time or workload knowledge even if it is not enough for the complete initialization effort a traditional DBMS would do.

Information Integration. Embodiments of the invention support querying multiple different data sources and formats. Embodiments can adopt format-specific plugins to handle different raw data file formats. Implementing these plug-ins in a reusable manner requires applying data integration techniques but may also require the development of new techniques, so that commonalities between formats are determined and reused. Additionally, supporting different file formats also requires the development of hybrid query processing techniques, or even adding support for multiple data models (e.g. for array data).

File System Interface. Various embodiments may also bridge the gap between file systems and databases. Unlike traditional database systems, data in embodiments can be stored in file systems, such as NTFS or ext4. This provides embodiments the opportunity to intercept file system calls and gradually create auxiliary data structures that speed up future queries. For instance, as soon as a user opens a CSV file in a text editor, an embodiment can be notified through the file system layer and, in a background process, start tokenizing the parts of the text file currently being read by the user. Future queries can benefit from this information to further reduce the query response time. Obtaining this information is reasonably cheap since the data has already been read from disk by the user request and is in the file system buffer cache. A file system interface also allows a the system to maintain its caches up to date, even if the user changes the raw data files outside of the embodiment.

Possible Embodiment in Computer Hardware

Figure 3:
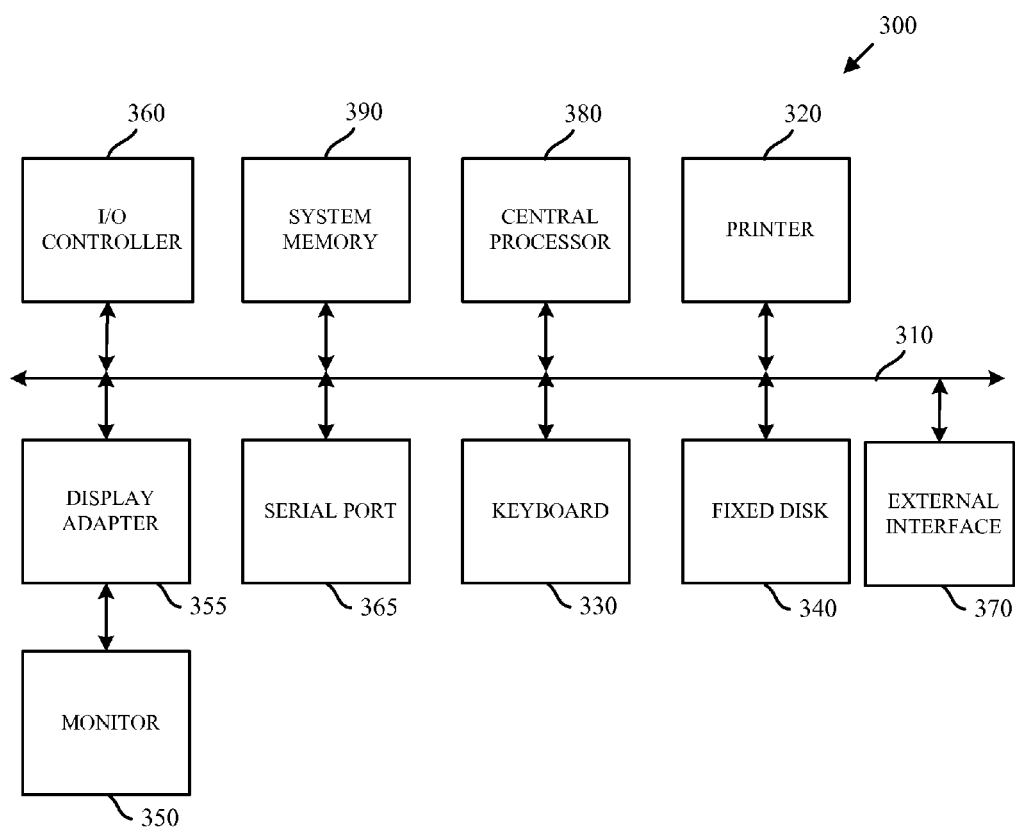
FIG. 3 shows a diagram of a computer system according to an embodiment of the current invention.

FIG. 3 shows the computer structure in one possible embodiment of the present invention. The subsystems shown in FIG. 3 are interconnected via a system bus 310. Additional subsystems such as a printer 320, keyboard 330, fixed disk 340 (or other memory comprising tangible, non-transitory computer-readable media), monitor 350, which is coupled to display adapter 355, and others are shown. Peripherals and input/output (I/O) devices (not shown), which couple to I/O controller 360, can be connected to the computer system by any number of means known in the art, such as serial port 365. For example, serial port 365 or external interface 370 can be used to connect the computer apparatus to a wide area network such as the Internet, a mouse input device, or a scanner. The interconnection via system bus allows the central processor 380 to communicate with each subsystem and to control the execution of instructions from system memory 390 or the fixed disk 340, as well as the exchange of information between subsystems. The system memory 390 and/or the fixed disk 340 may embody a tangible, non-transitory computer-readable medium.

Figure 4:
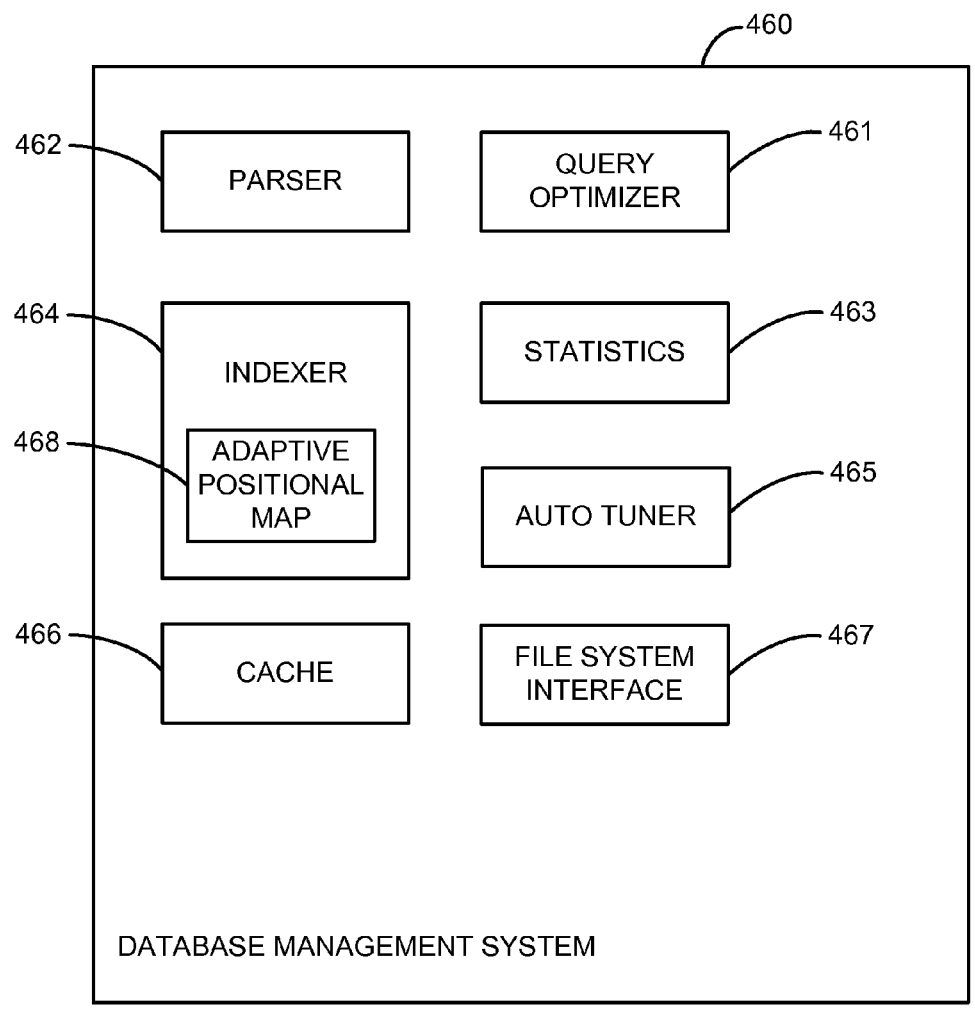
FIG. 4 shows a diagram of a database management system according to an embodiment of the current invention.

FIG. 4 shows an aggregate view of the present invention 460 as a comprising a plurality of functional units. Parser 462 includes functionality to read and parse a raw data file. Indexer 464 comprises of the adaptive positional map 468 and other indexing functionality. The cache 466 includes data saved in volatile or nonvolatile memory including but not limited to system 390 or fixed disk 340. Query optimizer 461 includes functionality to accept a query from sources such as I/O controller 360, central processor 380, serial port 365, keyboard 330, external interface 370. The statistics and auto tuner units may reside on any machine-readable medium, such as fixed disk 340, system memory 390, or be transferred from an external source. The file system interface 467 includes functionality to read data files in a variety of file system types (e.g., ReFS, NTFS, ext3, ext4, FAT32) and a variety of data formats (e.g., CSV, binary, TSV), through a variety of machine-readable media such as I/O controller 360, system memory 390, serial port 365, fixed disk 340, or external interface 370.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method of querying a data file, comprising:
    receiving a raw data file comprising of one or more tuples;
    receiving a database query referencing one or more attributes in the raw data file and requesting one or more attributes in the raw data file;
    tokenizing fields in a tuple in the raw data file comprising:
        a) determining the last field in the tuple referenced by the database query; and
        b) tokenizing fields in the tuple based on the determined field;
    augmenting a positional map data structure based on fields tokenized in the tokenizing step, wherein augmenting comprises at least adding additional metadata that was not present in the positional map data structure as populated during previous queries, and wherein augmentation of the positional map data structure is such the additional metadata is available for processing future queries, wherein the positional map data structure comprises a plurality of chunks, wherein each chunk comprises a plurality of attributes accessed together during query processing;
    parsing tokens from the tokenized fields, comprising:
        a) determining the tokens corresponding to attributes requested by the database query; and
        b) parsing the determined tokens, using the positional map data structure;
    composing result tuples, from the parsed tokens, comprising:
        a) determining the parsed tokens corresponding to the fields requested by the database query; and
        b) composing the determined tokens into a result tuple; and
    storing the resulting tuples in a non-transitory medium as a query result of querying the data file.

2. The method of claim 1, wherein the data file is in a text-based delimited format.

3. The method of claim 1, wherein the data file is in a format such that the fields are variable in length.

4. The method of claim 1, wherein the query language is SQL or a derivative of SQL.

5. The method of claim 1, wherein tokenizing further comprises:
    storing the position of token delimiters into an auxiliary data structure.

6. The method of claim 1, wherein parsing further comprises:
    storing the parsed tokens into an auxiliary data structure.

7. A database system, comprising:
    at least one computing device; and
    memory including instructions that, as a result of execution by the at least one computing device, cause the database system to:
        receive one or more data files, wherein the one or more data files possibly contain unstructured data;
        read data files, from among the one or more data files, containing unstructured data;
        receive, from a query optimizer, input of a database query;
        tokenize data conditionally based on the input received from the query optimizer;
        parse data conditionally based on the input received from the query optimizer; and
        maintain one or more auxiliary data structures, the one or more auxiliary data structures comprising one or more positional maps, wherein the one or more positional maps contain mappings from one or more tuples and attributes to the position of the corresponding field in the data file, wherein the one or more positional maps are based on fields tokenized prior to receiving the input from the query optimizer, wherein the one or more positional maps are augmented by tokenization performed in processing a database query for use as a future positional map for future database queries, wherein augmenting comprises at least adding additional metadata that was not present in one or more positional maps as populated during previous queries, and wherein the one or more positional maps comprise a plurality of chunks, wherein each chunk comprises a plurality of attributes accessed together during query processing.

8. The database system of claim 7, wherein the database system also includes a statistics module wherein the statistics module generates statistical information incrementally for attributes read during the processing of a query.

9. The database system of claim 7, wherein updates to a data file are reflected by incremental changes to the positional map that maintains the storage format or location of existing data in the positional map.

10. One or more non-transitory computer-readable storage media having stored thereon instructions that, when executed by one or more processors of a computer system, cause the computer system to:

receive a raw data file comprising of one or more tuples;

receive a database query referencing one or more attributes in the raw data file and request one or more attributes in the raw data file;

tokenize fields in a tuple in the raw data file comprising:
 a) determine the last field in the tuple referenced by the database query; and
 b) tokenize fields in the tuple based on the determined field;

augment a positional map data structure based on fields tokenized in the tokenizing step, wherein augmenting comprises at least adding additional metadata that was not present in the positional map data structure as populated during previous queries, and wherein augmentation of the positional map data structure is such the additional metadata is available for processing future queries, wherein the positional map data structure comprises a plurality of chunks, wherein each chunk comprises a plurality of attributes accessed together during query processing;

parse tokens from the tokenized fields, comprising:
 a) determine the tokens corresponding to attributes requested by the database query; and
 b) parse the determined tokens, using the positional map data structure;

compose result tuples, from parsed tokens, comprising:
 a) determine the parsed tokens corresponding to the fields requested by the database query; and
 b) compose the determined tokens into a result tuple; and store the resulting tuples in a non-transitory medium as a query result of querying the data file.

* * * * *